(12) United States Patent
Landauer

(10) Patent No.: US 6,226,881 B1
(45) Date of Patent: May 8, 2001

(54) HEIGHT-MEASURING DEVICE

(75) Inventor: Konrad S. Landauer, Chicago, IL (US)

(73) Assignee: Clover Global Group, Inc., Chicago, IL (US)

( * ) Notice: Subject to any disclaimer, the term of this patent is extended or adjusted under 35 U.S.C. 154(b) by 0 days.

(21) Appl. No.: 09/372,844

(22) Filed: Aug. 12, 1999

(51) Int. Cl.[7] ............................................. G01B 1/00
(52) U.S. Cl. .................................. 33/515; 33/511; 33/512
(58) Field of Search ............................ 33/511, 512, 515, 33/832, 833, 483, 484, 485, 492, 783, 806, 809, 810, 811, 812

(56) References Cited

U.S. PATENT DOCUMENTS

| | | | |
|---|---|---|---|
| 1,983,966 | * | 12/1934 | Boud ...................................... 33/512 |
| 1,985,527 | * | 12/1934 | Taylor .................................... 33/512 |
| 2,053,810 | * | 9/1936 | Bisel ...................................... 33/512 |
| 2,215,884 | * | 9/1940 | Runge .................................... 33/512 |
| 3,808,694 | * | 5/1974 | Hutchinson et al. ................... 33/512 |
| 4,118,868 | * | 10/1978 | Johnson ................................. 33/512 |
| 4,134,213 | * | 1/1979 | Kushmuk ............................... 33/512 |
| 4,638,563 | * | 1/1987 | Buniff ................................. 33/169 R |
| 4,694,581 | | 9/1987 | Heinrich et al. ...................... 33/169 |
| 5,402,585 | * | 4/1995 | Lund ..................................... 33/512 |
| 5,996,240 | * | 12/1999 | Casper .................................. 33/512 |
| 6,003,235 | * | 12/1999 | Chen ..................................... 33/515 |
| 6,073,359 | * | 6/2000 | Lee ....................................... 33/512 |
| 6,128,824 | * | 10/2000 | Yang ..................................... 33/511 |

* cited by examiner

*Primary Examiner*—Diego Gutierrez
*Assistant Examiner*—Quyen Doan
(74) *Attorney, Agent, or Firm*—Milton S. Gerstein

(57) ABSTRACT

The height-measuring device of the present invention is foldable, or collapsible, on itself, in order to provide an easier and less-costly method of packaging and shipping. The height-measuring device of the present invention is also provided with an inherent, slidable or extensible leg or setup section that is slidably mounted in the rear of the sale-part, which extensible leg has a length equal to the lowest measurement-reading of the scale-section, whereby the bottom edge surface of the scale-part may be readily located during installation of the height-measuring device the proper distance above the floor.

2 Claims, 3 Drawing Sheets

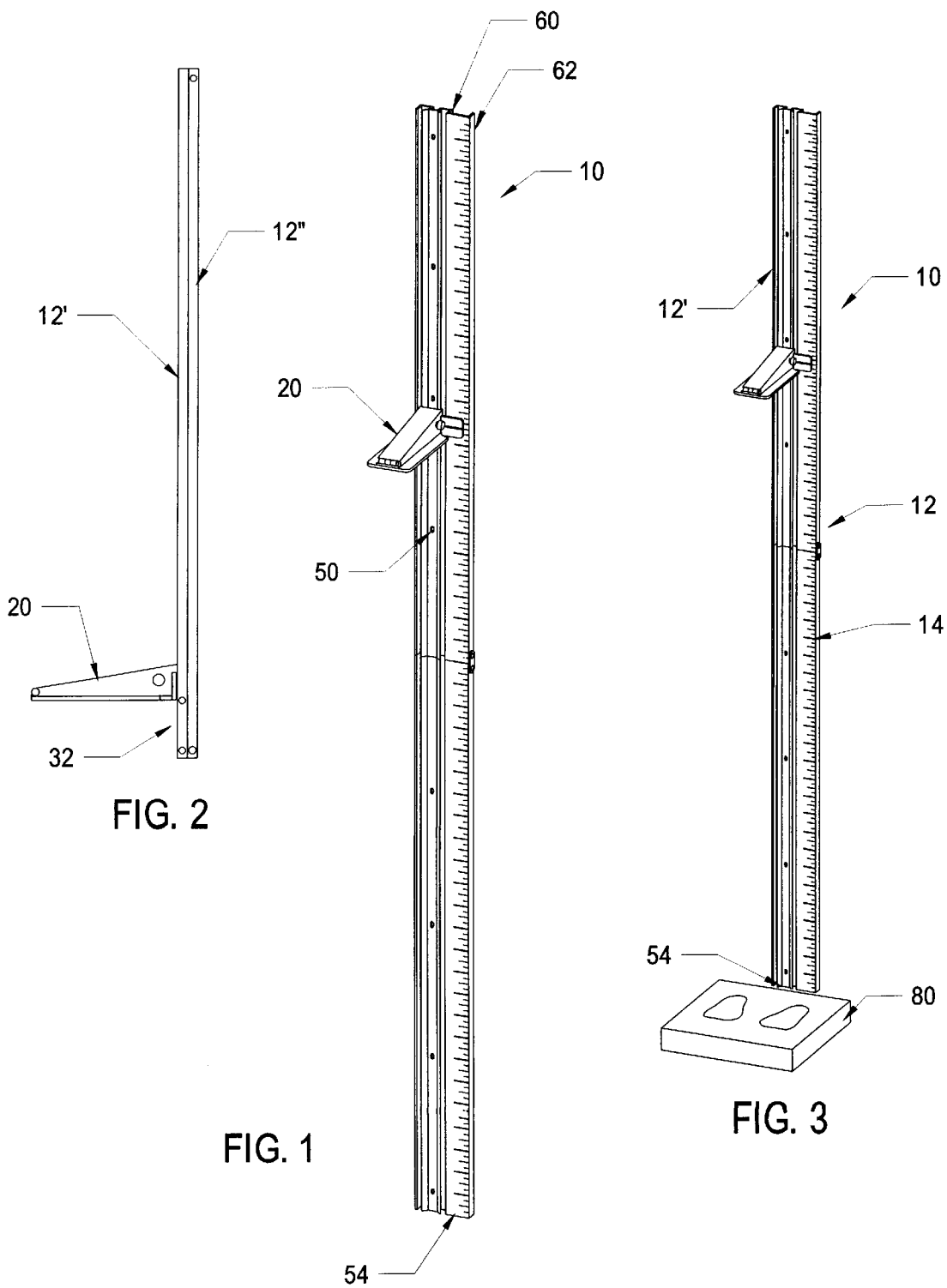

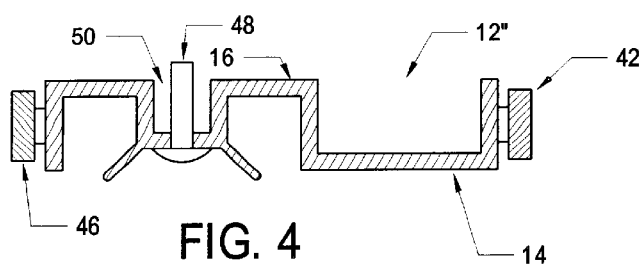
FIG. 4
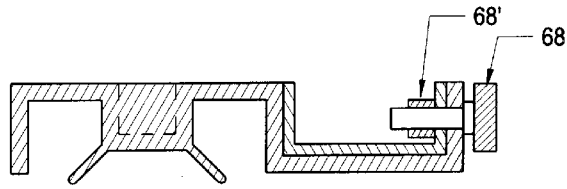
FIG. 5
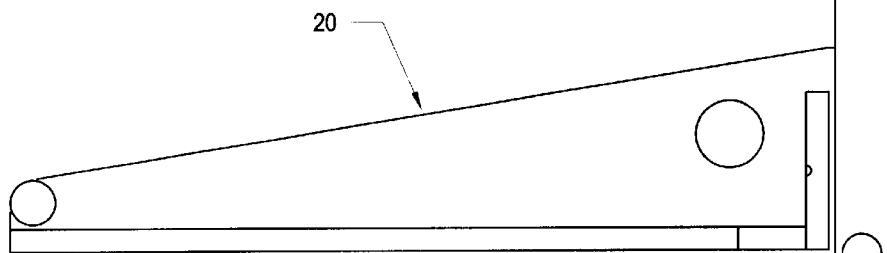
FIG. 6
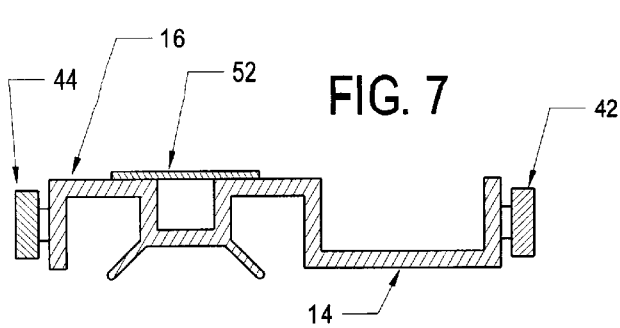
FIG. 7
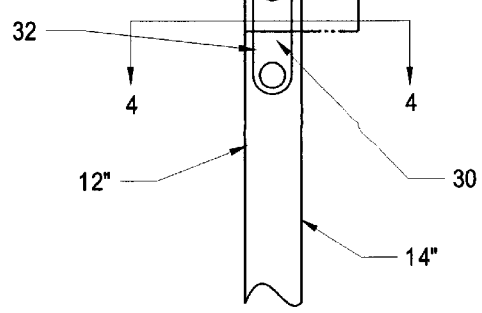

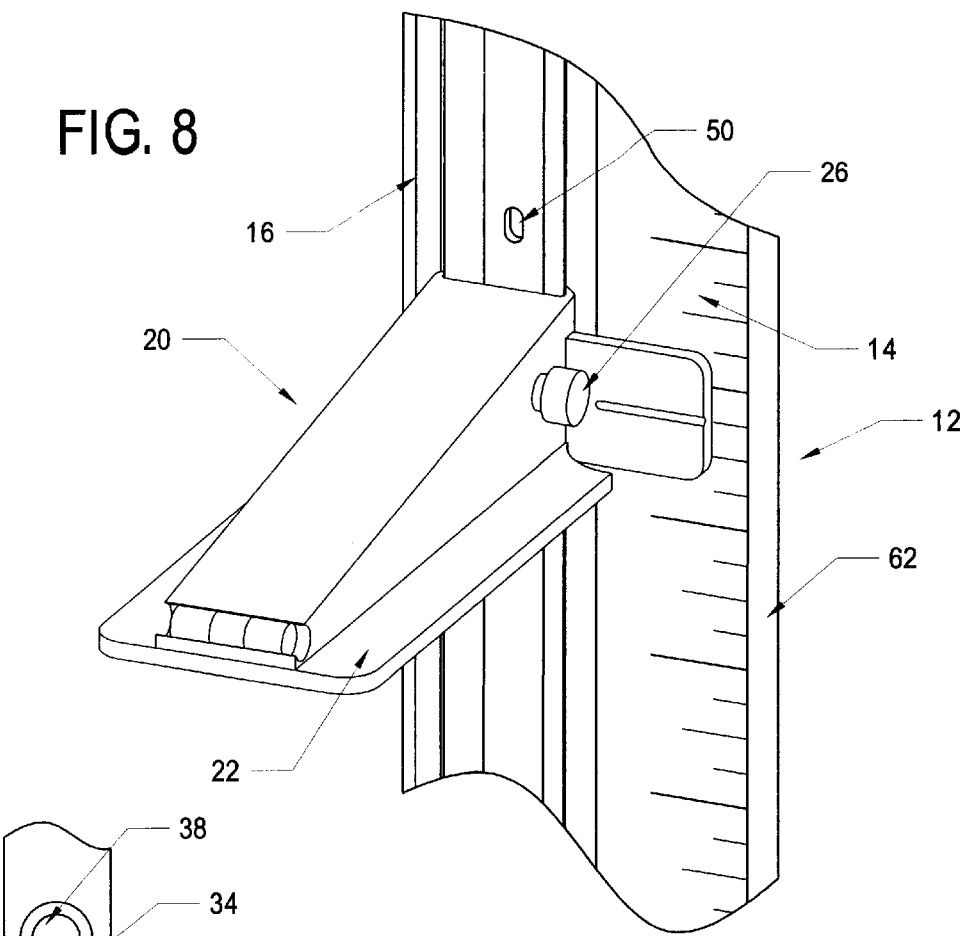
FIG. 8
FIG. 9
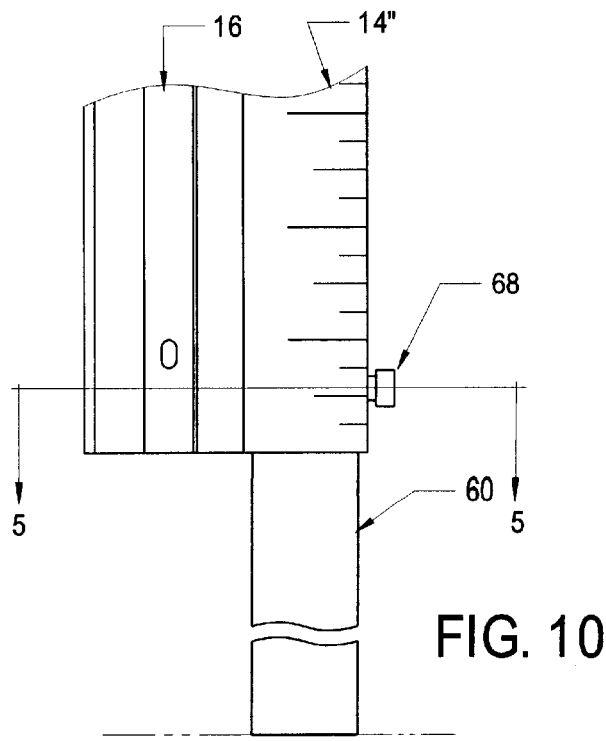
FIG. 10

HEIGHT-MEASURING DEVICE

BACKGROUND OF THE INVENTION

The present invention is directed to a device for measuring the height of a person, and has especial, but not limited, use to the measurement of the height of children and elderly persons suffering from osteoporosis. In U.S. Pat. No. 4,694,581 which is incorporated by reference herein, there is disclosed a height-measuring device in which there are provided a vertical scale-part that is used for measuring the height of child or adult. Connected to this scale-part is a mounting part by which the unit is vertically fastened to a wall. Also provided is a vertically slidable indicator part that is placed on the person's head and used to indicate on the vertical scale-part the height being measured. However, owing to the bulk of construction, this prior-art height-measuring device is costly to ship. Furthermore, when mounting this height-measuring device to a wall, the bottom edge-surface of the scale-section must be located a specific distance above the floor, which distance is that measurement at which the lower end of the scale-section starts; for example, since children that are able to stand are more than two feet tall, the scale-section will start with the measurement of twenty-four inches. Therefore, the bottom edge-surface of the scale-section must be located exactly twenty-four inches above the floor. Even though the fastening of the height-measuring device is performed only once, at the time of initial installation, this can be exacting task, and one that may be done incorrectly, if the installer of the height-measuring device is not careful.

SUMMARY OF THE INVENTION

It is, therefore, the primary objective of the present invention to eliminate the above-noted drawbacks of the height-measuring device disclosed in U.S. Pat. No. 4,694,581.

Toward these and other ends, the height-measuring device of the present invention is foldable, or collapsible, on itself, in order to provide an easier and less-costly method of packaging and shipping. The height-measuring device of the present invention is also provided with an inherent, slidable or extensible leg or set-up section that is slidably mounted in the rear of the scale-part, which extensible leg has a length equal to the lowest measurement-reading of the scale-section, that is twenty-four inches in length, whereby the bottom edge surface of the scale-part may be readily located during installation of the height-measuring device twenty-four inches up from the floor.

BRIEF DESCRIPTION OF THE DRAWING

The invention will be more readily understood with reference to be accompanying drawings, wherein:

FIG. 1 is an isometric view of the height-measuring device of the present invention;

FIGS. 2 is a side, elevational view thereof showing the device folded, or collapsed, on itself for storage and shipping;

FIG. 3 is an isometric view of the height-measuring device of the present invention, as attached to a wall, with foot-prints and scale placed on the floor to indicate to the person the location he or she should stand, in order to properly measured and weighed;

FIG. 4 is a cross-sectional view taken along line 4—4 of FIG. 6;

FIG. 5 is a cross-sectional view taken along line 5—5 of FIG. 10,

FIG. 6 is a side view showing the connection between the two sections of the scale-part and the mounting part, with a fastener strap thereon for securing the two sections together when the height-measuring device has been unfolded for use;

FIG. 7 is a cross-sectional view similar to FIG. 4, but using mounting tape for mounting the device to a wall;

FIG. 8 is an isometric view showing the prior-art sliding indicator bracket used in the device of the present invention;

FIG. 9 is a detailed side view showing the cooperating retaining strap for connecting together members on each half-section of the device's scale-part and mounting part when the device has been unfolded for use; and FIG. 10 is a detailed side elevational view showing the extensible leg for use in setting up the device on a wall a specific distance vertically upwardly from the floor, which leg is slidable in the rear section of the scale-part of the height-measuring device of the present invention.

DETAILED DESCRIPTION OF THE INVENTION

Referring out to the drawings in greater detail, there is shown the height-measuring device 10 of the present invention. The height-measuring device 10 includes a main body or frame 12 consisting of a first scale-section or part 14 and a rail-mounting section or part 16, as best seen in FIG. 8. Slidably mounted to the rail-mounting section, via guide rails 18, 18', is a bracket-indicator member 20 which slides vertically therealong, which bracket-indicator member has a bottom flat surface portion 22 which rests upon the child's or adult's head as he or she is being measured. The bracket-indicator member is held in place by means of a screw having enlarged head 26 on side of the bracket-indicator member and a cooperating nut on the other side, as fully described and shown in U.S. Pat. No. 4,694,581. According to the present invention, the main body frame or portion 12 is made up of two separate parts: An upper section 12' and a lower section 12". The upper and lower sections may or may not be pivotally connected together at their respective edge-surfaces 30 (see FIG. 6). Such a pivotal connection may be by means of a conventional living hinge or other conventional hinge. Such an arrangement allows the main body frame to be folded up or collapsed for storage and transport. If there is no pivotal connection, then the two sections are just simply stored back-to-back The lower section 12" is pivoted counterclockwise when viewing FIG. 6, so that the rear surface of the lower section abuts against the rear surface of the upper section, so that the bracket-indicator member 20 does not interfere with the folding, or collapse of the device, as can be seen in FIG. 6. Since the height-measuring device 10 is only folded up or collapsed for initial storage and transport, the upper and lower sections need not be retained together, although it is within scope and purview of the present invention to provide for such a retainer. When the device 10 is removed from its shipping carton, and unfolded or erected for use, there are provided stiff fastening straps 32 on each side surface of the main frame 12. Each fastening strap 32 spans the edge-surfaces 30 of the lower and upper sections, as can be seen in FIGS. 6 and 9. Each strap 32 consists of an elongated member 32', having an upper end 34 and a lower end 36. Projecting rearwardly from each upper and lower end 34, 36 is a conventional fastening button or member 38, 40, respectively, such as snap-fit connections, which cooperate with conventional mating fasteners elements 42, 44, provided on the side surfaces of the upper and lower sections 12', 12", as can be seen in FIGS. 4 and 6. The mating fastener elements 42, 44 of the lower section 12" is located in opposite juxtaposition to the similar mating fastener elements of the upper section 12', as seen in FIGS. 6 and 9. When the height-measuring device 10 is in its folded or collapsed storage-state, the lower fasteners 40 are disconnected from the mating fastener elements 42, 44 of the lower section 12", so that the fastening straps 32 may simply hang down from the lower edge-surface 30 of the upper section 12'. When the height-measuring device is ready to be installed at a fixed premises, such as a doctors office, the lower section 12" is moved or pivoted down in the clockwise direction, and firmly fastened in vertical alignment with the upper section 12' by connecting lower fastening member 36, 38 of the fastening straps 32 to the mating or cooperating elements 42, 44 on the lower section 12". The fastening straps will keep the upper and lower sections 12', 12" in perfect alignment, as the main frame 12 is secured to a wall by means of screws 48 passing through selected holes 50 formed in the rail-mounting section 16.

In FIG. 7, there is shown an alternative manner of securing the main frame to the wall. Instead of using screws, two-sided tape 52 may be used along the rear surface of the rail-mounting section 16, at spaced intervals.

Referring now to FIGS. 5, 9 and 10, there is shown another aspect of the present invention. As stated above, the lower edge-surface 54 of the lower scale half-section 14" starts with a measurement of twenty-four inches. Therefore, the lower edge-surface 54 must be located twenty-four inches above the floor. Therefore, the height-measuring device 10 of the invention is provides an extensible orienting leg or member 60 that is slidable in the rear of the scale half-section 14". The scale-section 14 has a U-shaped cross-section defined by rearwardly-facing leg-sections, 62, as seen in FIG. 1, 3 and 8. The extensible leg has a rectangular cross-section for a sliding fit between the two leg-sections, 62. The extensible leg 60 is provided with a vertically-extending slot (not shown) by which the extensible leg is held in a desired location by means of retaining screw 68 passing through the slot. The screw is tightened in place by means of a nut 68'. The screw passes through a hole formed in the leg-section 62, and then through the vertically-extending slot, whereby the head of the screw and the nut sandwich therebetween the extensible leg 60. During storage and shipping, the extensible leg 60 is in an upper position. When it is necessary to install the device, the extensible leg 60 is lowered by loosening the screw 68, and sliding the extensible leg to its downward location, where the leg protrudes from the lower edge-surface by a distance of twenty-four inches. The installer will know when the extensible leg extends twenty-four inches from the lower edge-surface of the lower scale-section 12". An indicator may be provided on the extensible leg indicating that twenty-four inches of extensible leg 60 has been pulled out. This indicator may be a line on the extensible leg, which, when juxtapositioned against the lower edge-surface of the scale-section 14, will indicate to the installer that twenty-four inches has been extended. At this point, the mounting screws are inserted through the holes 50 in the rail-mounting section 16, whereby the height-measuring device 10 is fastened to the wall for use. After such installation, the device 10 is operated in the same manner as disclosed in U.S. Pat. No. 4,694,581.

In a modification of the device 10, there may also be provided a conventional weighing scale 80 mounted in the floor of the room where the device 10 is mounted, and directly aligned therebelow as seen in FIG. 3. On the upper surface of the scale 80 is imprinted, or otherwise, marked, a pair of feet indicating to the person where to stand, whereby he or she may be weighed and measured at the same time, with the foot-prints ensuring proper location for both the weighing and the measuring.

While a specific embodiment of the invention has been shown and described, it is to be understood that numerous changes and modifications may be made therein without departing from the scope and spirit of the invention as set forth in the appended claims. For example, any conventional slide-retainer may be used besides the screw 68 discussed hereinabove. In addition, the extensible leg 60 may be slidingly mounted in the U-shaped rail-mounting section 16. Moreover, other conventional fastening means besides the fastening strips 32 may be used. In addition, instead of the extensible leg 60 being slidable, it may pivotally mounted and swung out during installation.

What is claimed is:

1. In a height-measuring device for measuring the height of a person, which device comprises a main frame having a first vertical wall-mounting section and a second vertical scale-section connected laterally to each other along adjacent vertical side edge-surfaces, a bracket-indicator slidably mounted to first vertical wall-mounting section for vertical movement therealong, said bracket-indicator having indicating means cooperating with said second scale-section for indicating on said second scale-section the height-measurement of a person being measured, the improvement comprising:

said main frame comprising at least first and second vertical leg-sections, each of said at least first and second vertical leg-sections having an edge surface juxtapositioned next to the edge surface of the other of said first and second vertical leg-sections, whereby said at least first and second leg-sections are collapsed one upon the other for storage and shipment; and an extensible installation measuring leg for use in vertically installing said first and second sections to a wall a specified distance above the floor; said extensible measuring leg being operatively connected to at least one of said first vertical wall-mounting section and said second scale-section for movement between a retracted state within said at least one of said first-vertical wall-mounting section and said second scale-section for storage and shipping, and an extended state exteriorly of said at least one of said first vertical wall-mounting section and said second scale-section for use in locating the lower edge-surface of the second scale-section said specified distance above the floor;

said extensible mounting leg being operatively connected to said at least one of said first vertical wall-mounting section and said second scale-section in both said erected state and said retracted state thereof;

said extensible measuring leg being mounted for relative movement to said at least one of said first vertical wall-mounting section and second vertical scale-section when said wall-mounting and scale-sections are erected for use in vertical orientation, whereby, during installation of the device, the extensible measuring leg is moved downwardly from within said at least one of said first vertical wall-mounting section and said second vertical scale-section said specified distance for placing the lower edge-surface of said second scale-section said specified distance above the floor;

one of said first and second sections comprising retaining means for retaining said extensible measuring leg in its extended state, and comprising a rearwardly-facing channel in which said extensible measuring leg is mounted; said retaining means retaining said extensible measuring leg in its fully-extending position at said specified distance;

said second scale-section having said specified distance as the lowest scale-reading thereof.

2. The height-measuring device for the measuring the height of a person, according to claim 1, wherein said retaining means comprises a retaining screw passing through a wall of said channel of said second scale-section and against said extensible measuring leg.

* * * * *